United States Patent [19]

Hill

[11] Patent Number: 5,339,528
[45] Date of Patent: Aug. 23, 1994

[54] TRANSPARENCY HOLDER FOR NAVIGATION AID

[75] Inventor: David C. Hill, Oakville, Ontario, Canada

[73] Assignee: Navimap Corporation

[21] Appl. No.: 572,753

[22] Filed: Aug. 24, 1990

Related U.S. Application Data

[63] Continuation-in-part of Ser. No. 471,943, Jan. 29, 1990, Pat. No. 5,060,390.

[51] Int. Cl.[5] .................. G01C 17/02; G01C 21/00
[52] U.S. Cl. ......................... 33/1 SD; 33/352; 353/11; 353/DIG. 5; 359/809
[58] Field of Search ............... 33/1 SD, 1 SB, 1 SA, 33/1 SC, 352, 355 R, 364; 353/11, 12, 39, DIG. 5, 43; 350/235, 237, 238, 241, 243, 244; 359/798, 800, 801, 806, 809, 810, 803, 807

[56] References Cited

U.S. PATENT DOCUMENTS

| | | | |
|---|---|---|---|
| 2,210,773 | 8/1940 | Niemeyer | 33/1 SD |
| 3,094,781 | 6/1963 | Vangor | 33/1 SD |
| 3,242,605 | 3/1966 | Kleinschmidt | 353/120 |
| 3,269,261 | 8/1966 | Porter | 353/DIG. 5 |
| 3,344,707 | 10/1967 | Jullien-Davin | 353/11 |
| 3,983,630 | 10/1976 | Hamm et al. | 33/1 SD |
| 4,335,521 | 6/1982 | Rutherford | 33/1 SD |
| 4,422,738 | 12/1983 | Steele | 353/11 |

*Primary Examiner*—Thomas B. Will
*Attorney, Agent, or Firm*—Volpe & Koenig

[57] ABSTRACT

A transparency holder for use in a navigation device is disclosed. The transparency holder is positioned between a lens and a compass, and is adapted to receive a map transparency in one correct orientation only. The one orientation only feature is achieved by providing certain asymmetric features, such as off-center notches which engage complementary features in the navigation device. In the preferred embodiment, the transparency holder has integral upper and lower halves hinged together by a living hinge and sandwiching the map transparency therebetween.

6 Claims, 4 Drawing Sheets

TRANSPARENCY HOLDER FOR NAVIGATION AID

REFERENCE TO RELATED APPLICATION

This is a continuation-in-part of application Ser. No. 07/471,943, filed Jan. 29, 1990, now U.S. Pat. No. 5,060,390.

BACKGROUND OF THE INVENTION

This invention relates generally to navigation aids and devices, and particularly to a device for converting map bearings to provide an indication of the true land or sea bearing, and more particularly to a transparency holder for use in connection with said device.

In reading a map and navigating with a compass, amateur or occasional navigators frequently fail to properly account for magnetic declination, either by neglecting it entirely, or by taking it in the wrong direction, thus producing an error of twice the magnetic declination. More seriously, amateur or occasional navigators may align the compass needle incorrectly or misinterpret the reading or make other similar errors to produce a 180 degree error.

There is a need for a navigation device which facilitates relatively foolproof conversion of map data into a land or sea bearing to be taken.

SUMMARY OF THE INVENTION

It is thus an object of the invention to provide, for a navigation device which facilitates relatively foolproof conversion of map data into a land or sea bearing to be taken, a transparency holder which is adapted to permit the insertion of a map transparency in one orientation only.

In the navigation device, a grid, a map transparency and a compass are combined such that map information can be directly converted to a land or sea bearing in virtually foolproof fashion. More particularly, the navigation device involves, mounted in a case parallel to and aligned with each other, a lens across an opening at one end of the case and a compass, having a body, transparent faces and a magnetic compass needle, across an opening at the opposite end of the case. The transparency holder is positioned between the lens and the compass, adapted to receive a map transparency with magnetic north thereon aligning with a north marking on the body of the compass, at a distance from the lens approximating the focal length of the lens. A grid wheel is provided between the transparency holder and the compass, having a transparent or translucent central area inscribed with parallel grid lines and at least one first directional arrow aligned parallel to the grid lines, the grid wheel being in close proximity to the transparency holder such that it is also at a distance from the lens approximating the focal length of the lens. Positioned between the grid wheel and the compass, and geared to the grid wheel for counter-rotation therewith, is a direction wheel having a transparent or translucent central area inscribed with at least one second directional arrow. A bearing may thus be taken by examining an installed map transparency through the lens, rotating the grid wheel and direction wheel to align the grid lines and the at least one first directional arrow with the desired direction of travel on the map, then aligning the compass needle with the north marking on the body of the compass, the at least one second directional arrow then indicating the bearing to be taken.

Alternatively, as described below, the map transparency may be positioned between the grid wheel and the direction wheel, adjacent the grid wheel.

In the invention, the transparency holder has certain asymmetric features which ensure that it can only be installed in the navigation device in the one correct orientation.

Further features of the invention will be described or will become apparent in the course of the following detailed description.

BRIEF DESCRIPTION OF THE DRAWINGS

In order that the invention may be more clearly understood, the preferred embodiment of the navigation device and of the transparency holder will now be described in detail by way of example, with reference to the accompanying drawings, in which.

DETAILED DESCRIPTION OF THE PREFERRED EMBODIMENT

Figure 1:
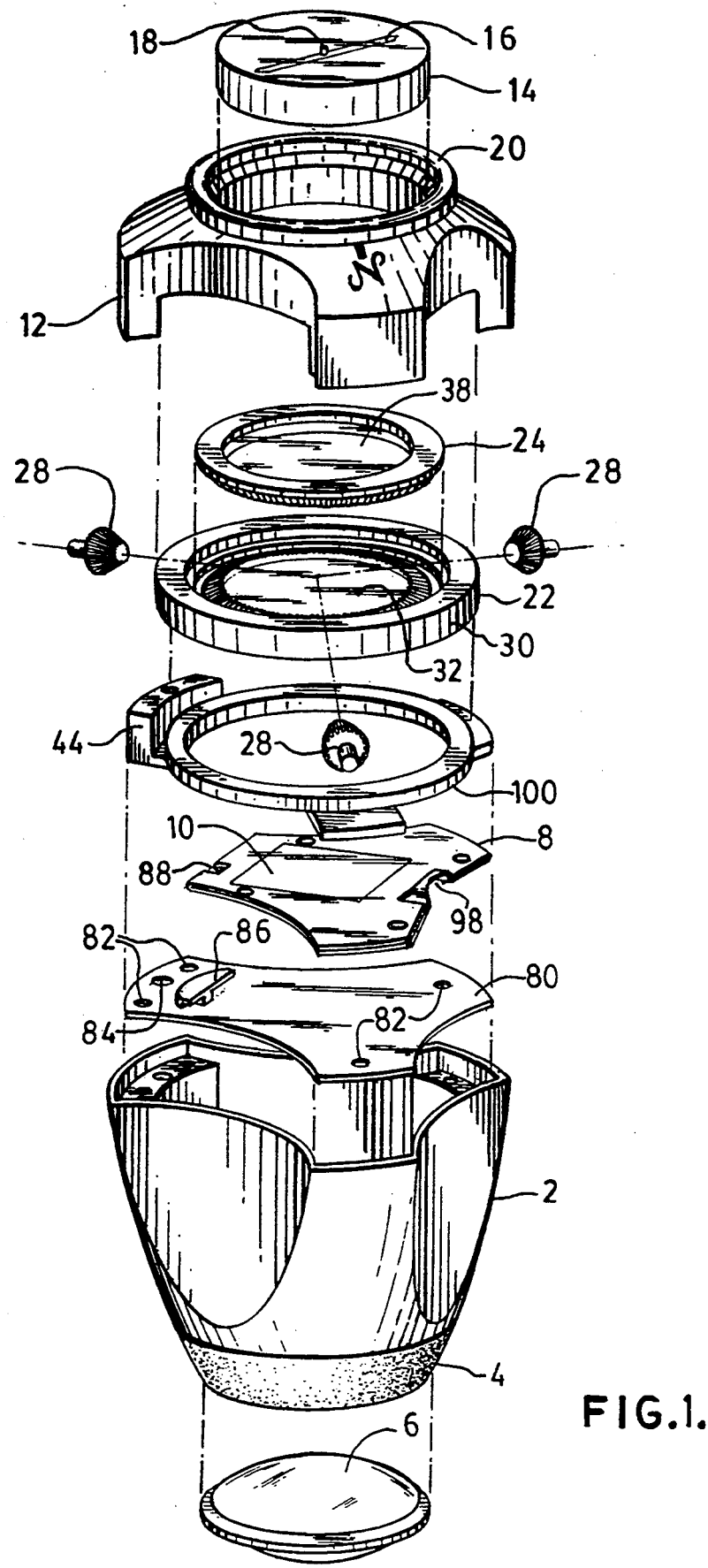
FIG. 1 is an exploded perspective, showing the various components of the navigation device.

In the preferred embodiment of the navigation device, there is a case, comprising a lower casing 2 and an upper casing 12. Mounted across the bottom end of the lower casing 2 in a rubber eye piece 4 is a lens 6. A transparency holder 8 is positioned on a transparency support 80 across the upper end of the lower casing, to receive a map transparency 10. The transparency holder is at a distance from the lens approximating the focal length of the lens.

The upper casing 12 is removably fastened to the lower casing 2. A conventional compass 14, having a compass needle 16 mounted on a pin 18, is positioned across the upper end of the upper casing. A "North" or "N" marking, or other suitable indicator, is on the upper surface of the compass or, as illustrated in FIG. 1, on the upper casing adjacent the compass. A rubber ring 20 projects axially from the upper end of the upper casing to protect the casing and compass.

A grid wheel 22 and a direction wheel 24 are mounted between the upper and lower casings. The wheels have gear-teethed areas 26. Small gears 28, preferably three in number, are evenly spaced in fixed positions between the gear-teethed areas, rotation of one wheel thus producing counter-rotation of the other. One of the wheels, namely the grid wheel 22 in the illustrated embodiment, has a ring portion 30 projecting outwardly from at least a portion of the upper and lower casings, for use by the user to rotate the wheels.

The grid wheel 22 has a transparent or translucent central portion 32, inscribed with parallel grid lines and at least one first directional arrow aligned parallel to the grid lines. It is in close proximity to the transparency holder, such that it is also at a distance from the lens approximating the focal length of the lens. Thus when the user looks through the lens, both the map transparency and the grid lines are essentially in focus.

The direction wheel 24 has a transparent or translucent central portion 38 inscribed with at least one second directional arrow. Since it is spaced from the transparency and grid location by virtue of the small gears 28, the second directional arrow 40 is not seen in focus.

Having one or both of the grid wheel and direction wheel with a translucent as opposed to transparent central portion may improve readability of the map transparency by diffusing available light evenly, provided that excessive attenuation is avoided. On the other hand, the navigation device clearly will work if both are transparent.

The upper and lower casings are fastened to each other in such a way that they can be separated to permit transparencies to be changed, such as by lifting the upper casing out of a detent in the lower casing against the force of a spring, to disengage the casings from each other, and then pivoting the upper casing away from the lower casing.

The map transparency 10 must be prepared such that magnetic north is aligned with the N or North marking on the body of the compass.

The device is extremely simple to use. A bearing may be taken by looking at the map transparency through the lens 6, and manipulating the ring 30 so as to thereby rotate the grid wheel 22 and direction wheel 24, to align the grid lines and directional arrows thereon with the desired direction of travel on the map. Then the device is flipped over, and the compass needle is aligned with the North marking on the case (or on the body of the compass). The second directional arrow then indicates the bearing to be taken.

Further details on the construction of the navigation device itself are available in the related application referred to above. However, the focus of the present specification is not on the navigation device itself, but on the transparency holder.

It is essential that the transparency be inserted with the correct orientation. Clear indicia could be marked on the transparency holder, e.g. "This Side Up" and/or "This Edge In", or a pattern on the transparency frame could be matched to a pattern on the transparency support. However, it is preferable to make it physically impossible to insert the transparency incorrectly, for example by using a tapered or asymmetrical transparency frame and complementary support.

In the preferred embodiment shown in FIGS. 1-4, the transparency holder 8 is positioned on a transparent transparency support 80 across the upper end of the lower casing. The transparency support is fastened to the lower casing by four screws passing through holes 82. (The fifth hole 84 is for the socket screw which connects the upper and lower casings to pass through.) On the platform is a "tee" 86, positioned off the center line of the platform so as to create asymmetry. The transparency holder 8 fits in partly under the tee, with a notch 88 engaging the base of the tee. The top of the tee preferably is spaced from the platform by the thickness of the transparency holder, so that the transparency holder is held down against the platform.

Figure 2:
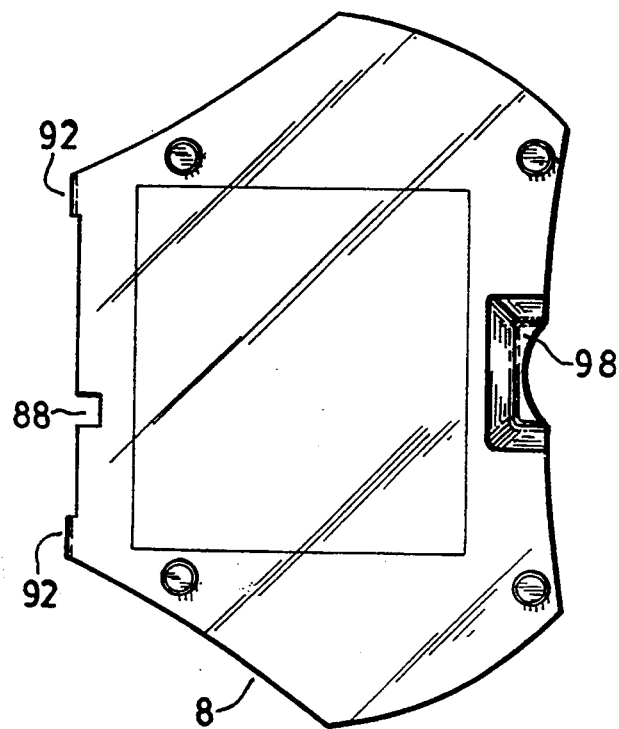
FIG. 2 is a top view of the preferred embodiment of the transparency holder, assembled.
Figure 3:
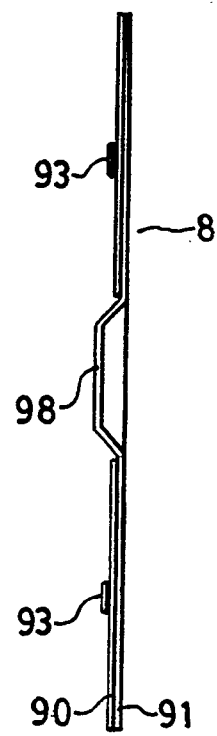
FIG. 3 is a side view of the transparency holder.
Figure 4:
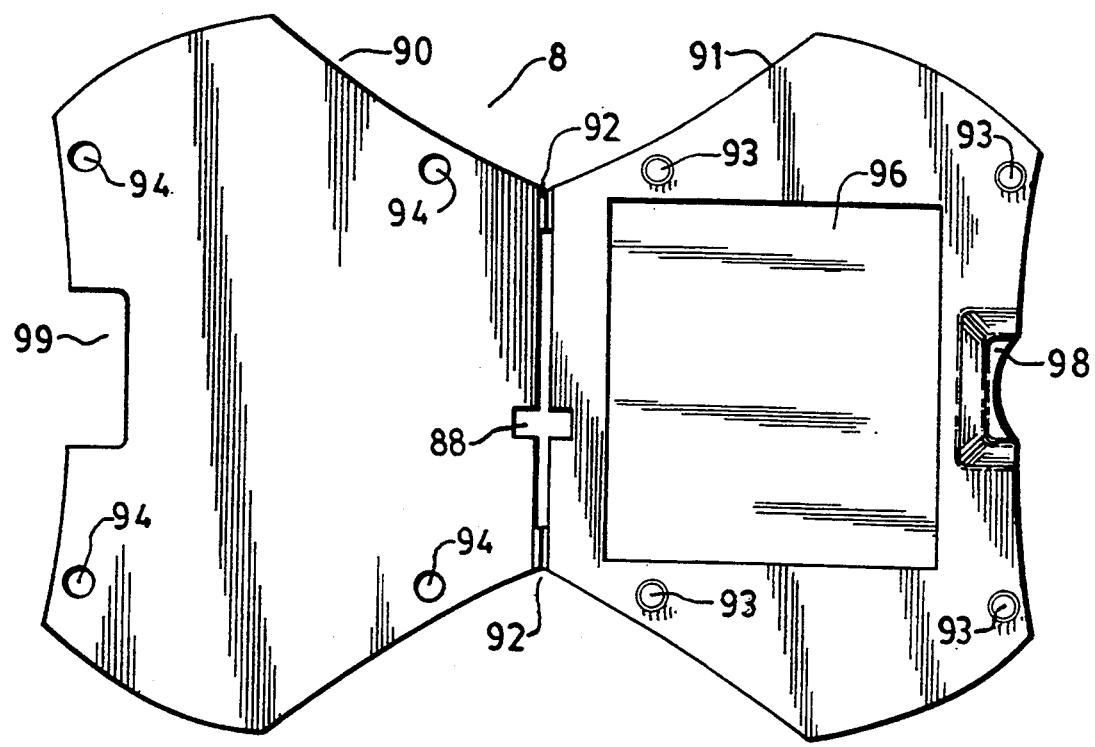
FIG. 4 is a top view of the transparency holder, opened.

As seen in greater detail in FIGS. 2-4, the transparency holder 8 has an upper half 90 and a lower half 91, connected by integral living hinges 92. Four posts 93 snap through corresponding holes 94 to lock the holder closed once a transparency is installed. The transparency holder is of transparent plastic, and has a central portion 96 which is recessed from the inner surface of the lower half 91 by about the thickness of the actual map transparency. The map transparency is inserted in the correct orientation, and then the holder is snapped shut.

The lower half 91 has a finger grip portion 98 which projects upwardly from the lower half through a notch 99 in the upper half. This facilitates insertion and removal of the transparency holders, i.e. to switch maps. The finger grip portion preferably projects upwardly to the same height as the top of the tee 86, and against the underside of the ring 100, so that the transparency holder is securely positioned.

Figure 5:
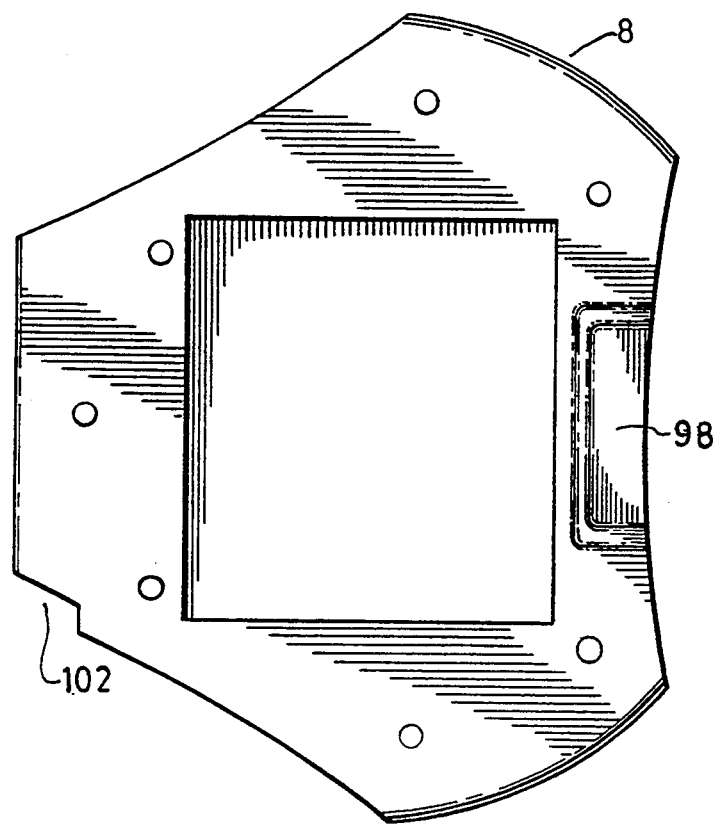
FIG. 5 is a top view of an alternative embodiment of the transparency holder, assembled.
Figure 6:
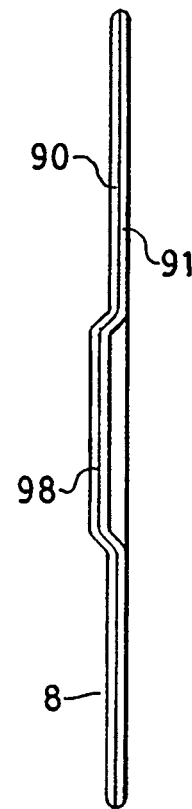
FIG. 6 is a side view of the transparency holder.
Figure 7:
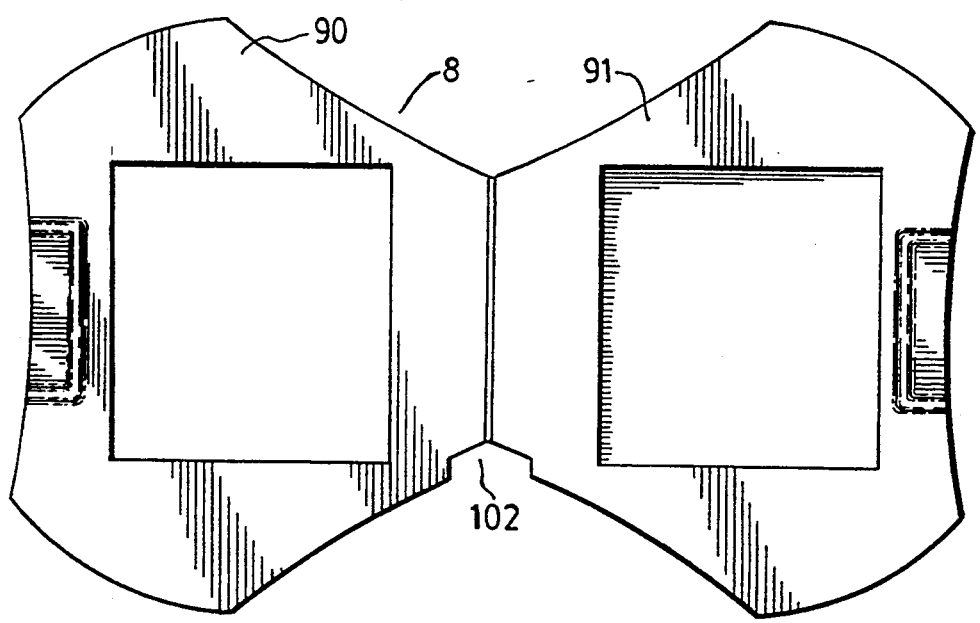
FIG. 7 is a top view of the transparency holder, opened.

In the alternative embodiment shown in FIGS. 5-7, the same principle is used, but instead of the notch 88, a notch 102 is provided at one edge of the hinged portion.

Figure 8:
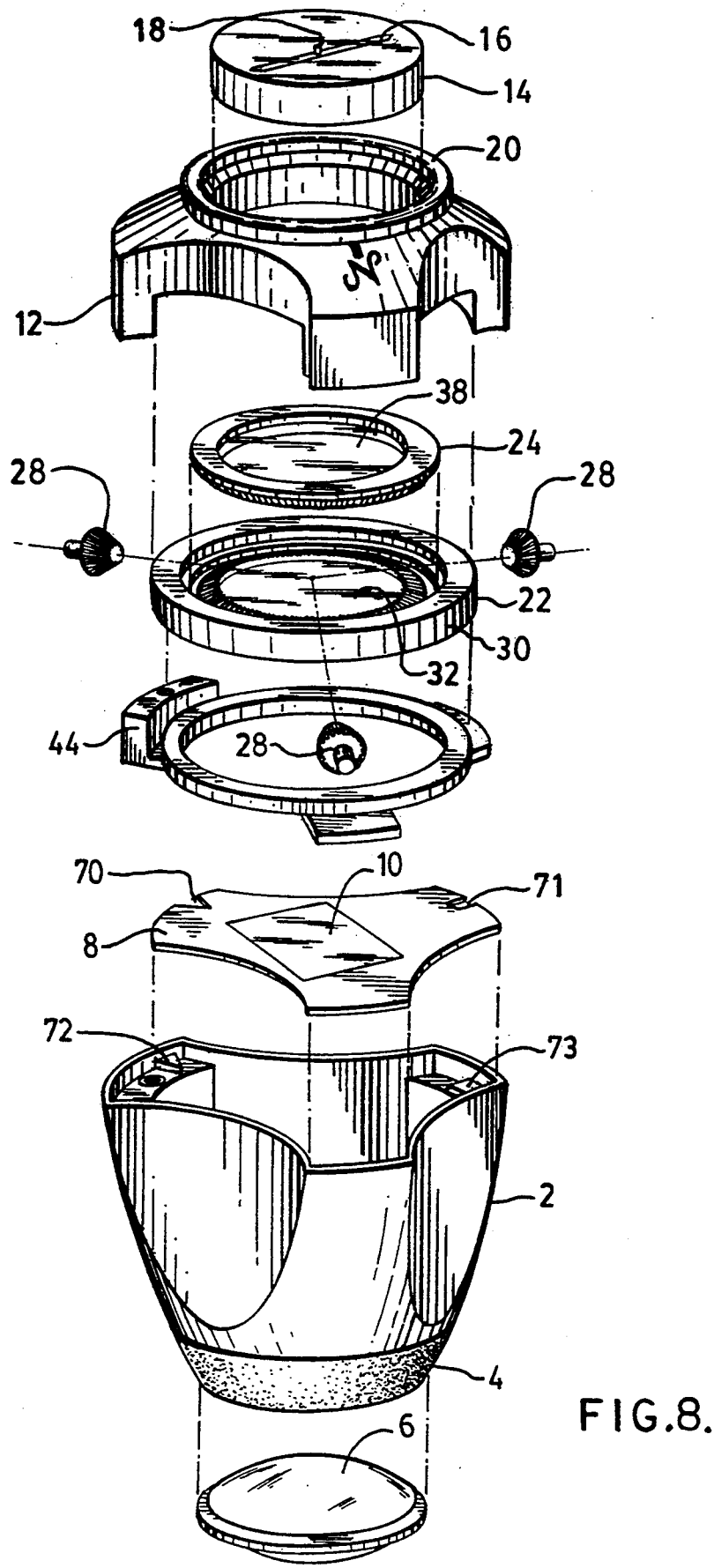
FIG. 8 is an exploded perspective, showing the various components of the navigation device, with an alternative transparency holder arrangement.

Another alternative embodiment is shown in FIG. 8. In this embodiment, there is no support 80, but merely the transparency holder 8 itself, provided with at least one notch positioned so as to create asymmetry, such as notches 70, 71 matching complementary projections 72, 73 respectively.

Instead of the map transparency being positioned between the grid wheel and the lens, it should be appreciated that it may be positioned between the grid wheel and the direction wheel, adjacent the grid wheel, although such alternative positioning is slightly more difficult from an assembly viewpoint. The transparency holder has to have slots in it to provide space for the small gears 28. The grid wheel obviously must be transparent rather than merely translucent in such an arrangement.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, asymmetry could be provided by means other than notches. Regardless of the actual construction of the transparency holder or of its location, some form of asymmetry must be provided, whether in the form of notches as described above, or by other means such as making a transparency holder which is generally asymmetrical in shape (as opposed to being generally symmetrical but having asymmetric features such as off-center notches). Such obvious variations are considered to be within the scope of the invention.

I claim:

1. A map transparency holder for insertion in a navigational device of the type which required that the map transparency be correctly oriented in the navigational device, the map transparency holder having asymmetric alignment means that are positioned to engage complementary asymmetric alignment means on the navigational device as a precondition to insertion of the map transparency in the correct orientation and to prevent installation of the transparency holder in the navigational device until the asymmetric alignment means and the complementary asymmetric alignment means are complimentarily engaged.

2. A transparency holder as recited in claim 1, in which said transparency holder comprises transparent upper and lower halves fastenable to each other to sandwich said map transparency therebetween.

3. A transparency holder s recited in claim 2, in which said upper and lower halves are integral and connected to each other by a living hinge.

4. A transparency holder as recited in claim 3, in which at least one of said upper and lower halves has a recessed area, the total depth of said recessed area(s) corresponding to the thickness of a map transparency.

5. A transparency holder as recited in claim 2, in which at least one of said upper and lower halves has a recessed area, the total depth of said recessed area(s) corresponding to the thickness of a map transparency.

6. A map transparency holder for insertion in a navigational device of the type wherein the map transparency must be correctly oriented in the navigational device, the transparency holder having an asymmetric configuration that complimentarily engages a support means on said navigational device and prevents installation of the transparency holder in said device when there is misalignment of the asymmetric transparency holder and the complementary asymmetric support.

* * * * *